United States Patent
Zaggl et al.

(10) Patent No.: US 11,092,253 B2
(45) Date of Patent: Aug. 17, 2021

(54) CHECK VALVE

(71) Applicant: W. L. Gore & Associates GmbH, Putzbrunn (DE)

(72) Inventors: Alexander Zaggl, Aying (DE); Michael Rittmann, Putzbrunn (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 16/323,166

(22) PCT Filed: Aug. 9, 2017

(86) PCT No.: PCT/EP2017/070190
§ 371 (c)(1),
(2) Date: Feb. 4, 2019

(87) PCT Pub. No.: WO2018/033453
PCT Pub. Date: Feb. 22, 2018

(65) Prior Publication Data
US 2019/0178401 A1    Jun. 13, 2019

(30) Foreign Application Priority Data
Aug. 17, 2016   (EP) .................................... 16184626

(51) Int. Cl.
*F16K 17/02*    (2006.01)
*F16K 17/04*    (2006.01)

(52) U.S. Cl.
CPC .......... *F16K 17/02* (2013.01); *F16K 17/0453* (2013.01)

(58) Field of Classification Search
CPC ........ Y10T 137/7895; Y10T 137/7879; H01M 2/1229; H01M 50/325; F16K 17/02; F16K 17/0453
See application file for complete search history.

(56) References Cited

U.S. PATENT DOCUMENTS 2,394,911 A * 2/1946 Griswold ................ E03C 1/108
                                                    137/217
2,902,048 A * 9/1959 Ryan, Jr. ................... F16K 7/17
                                                    137/510
(Continued)

FOREIGN PATENT DOCUMENTS

DE    33 07 835 C2    2/1985
DE    69617707 T2     5/2002
(Continued)

OTHER PUBLICATIONS

Machine Translation of DE3307835 retrieved from espacenet.com on May 2020. (Year: 2020).*
(Continued)

*Primary Examiner* — Jessica Cahill
(74) *Attorney, Agent, or Firm* — Greenberg Traurig, LLP

(57) ABSTRACT

A check valve (1) for a through hole in a compartment wall (100) comprises an elastic membrane (20) covering an open end (16) of a flow passage (14), a base (11) to which the elastic membrane (20) is fixed, and a protector (30) covering at least a portion of the elastic membrane (20), wherein the elastic membrane is fixed to the base in a state where it is elastically stretched over and forced against a sealing surface (17) surrounding the open end (16) so as to seal the flow passage (14). The elastic membrane lifts from the sealing surface when the pressure in the flow passage is high. The elastic membrane may be air- or gas-permeable and, preferably, waterproof so as to impart a low pressure venting functionality to the check valve.

19 Claims, 8 Drawing Sheets

(56) References Cited

U.S. PATENT DOCUMENTS

Figure 1A:
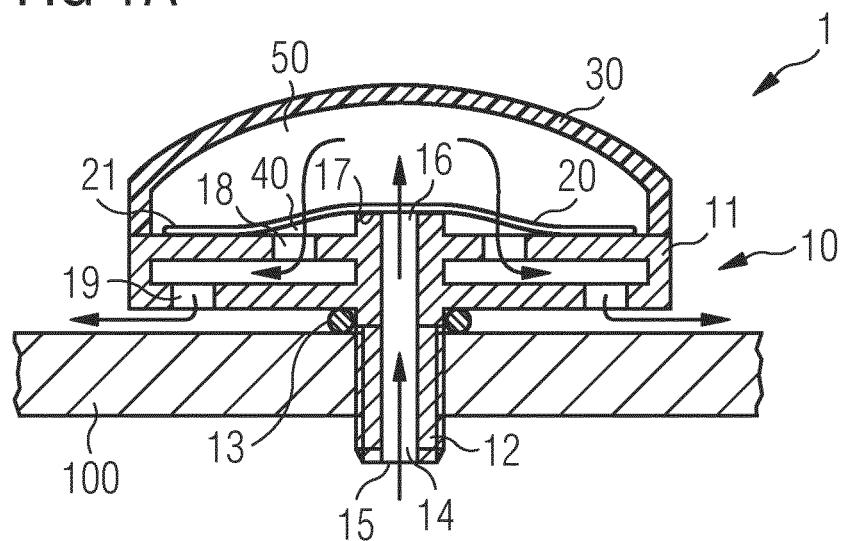

| | | | | |
|---|---|---|---|---|
| 4,241,756 A | * | 12/1980 | Bennett | A61M 16/20 137/496 |
| 4,461,313 A | * | 7/1984 | Beaumont | B60T 15/54 137/102 |
| 4,712,580 A | * | 12/1987 | Gilman | A61M 16/20 128/204.18 |
| 5,766,790 A | * | 6/1998 | Kameishi | H01H 37/54 429/56 |
| 5,814,405 A | * | 9/1998 | Branca | B01D 39/1692 264/127 |
| 10,330,094 B2 | * | 6/2019 | Gledhill, III | F04B 43/0054 |
| 2001/0050040 A1 | * | 12/2001 | Shimizu | F04B 43/0054 117/200 |
| 2003/0131890 A1 | * | 7/2003 | Xie | F16K 15/202 137/512.15 |
| 2003/0175582 A1 | * | 9/2003 | Phillips | H01M 2/1229 429/53 |
| 2004/0250864 A1 | * | 12/2004 | Zelson | F16K 15/144 137/859 |
| 2005/0039806 A1 | * | 2/2005 | Nakayama | H01M 50/325 137/853 |
| 2006/0076058 A1 | * | 4/2006 | Rypstra | F16K 17/0453 137/246 |
| 2007/0012624 A1 | | 1/2007 | Bacino et al. | |
| 2007/0241301 A1 | * | 10/2007 | Wincek | F16K 27/0236 251/335.2 |
| 2007/0289971 A1 | * | 12/2007 | Olszewski | G11B 33/146 220/361 |
| 2011/0079291 A1 | | 4/2011 | Blin et al. | |
| 2015/0108386 A1 | * | 4/2015 | Obara | F16K 7/12 251/331 |
| 2016/0036025 A1 | | 2/2016 | Hofer | |

FOREIGN PATENT DOCUMENTS

| | | |
|---|---|---|
| DE | 10 2014 014 740 A1 | 4/2016 |
| EP | 2 839 949 A2 | 2/2015 |
| EP | 2077888 B1 | 12/2015 |
| JP | 49-19329 | 2/1974 |
| JP | 53-128449 | 10/1978 |
| JP | 55-137766 | 10/1980 |
| JP | 58-188095 | 12/1983 |
| JP | 60-43764 | 3/1985 |
| JP | 61-215050 A | 9/1986 |
| JP | H08210529 A | 8/1996 |
| JP | 2003287150 A | 10/2003 |
| JP | 2012513941 A | 6/2012 |
| JP | 2015169214 A | 9/2015 |
| JP | 2010507431 A | 3/2020 |
| WO | WO-2007017033 A1 * | 2/2007 ......... F01M 13/0011 |
| WO | WO-2010/049092 A1 | 5/2010 |

OTHER PUBLICATIONS

International Search Report and Written Opinion issued in International Application No. PCT/EP2017/070190 dated Nov. 7, 2017.

* cited by examiner

CHECK VALVE

RELATED APPLICATIONS

The present application is a national phase filing under 35 USC 371 of International Application No. PCT/EP2017/070190 filed on Aug. 9, 2017, which claims priority to European Patent Application No. 16184626.6 filed Aug. 17, 2016, the entire contents and disclosures of which are hereby incorporated by reference.

The present invention relates to a check valve system, a check valve arrangement comprising the check valve system, and a method of using the check valve system.

More specifically, the check valve is designed for closing a through hole in a wall of a compartment in order to limit a pressure difference between an inside and an outside of a compartment and is particularly useful in connection with outdoor devices such as telecommunication equipment, street lighting or automotive applications. Examples are battery management, protective device ventilation or condensation management.

A general requirement for such check valves is a simple construction in order to keep the manufacturing costs and/or the assembly effort low, while at the same time it should operate reliably and reversibly, i.e. it should open at the desired pressure difference and not burst. Some applications require the check valve to open at very low pressure differences in one direction while simultaneously being watertight in the opposite direction.

US 2016/0036025 A1 discloses a check valve system for a through hole in a wall of a compartment to limit a pressure difference between an inside and an outside of the compartment, e.g. for a battery housing used in the interior of a motor vehicle. The check valve has a base having a flow passage with an open end and a ceiling surface surrounding the open end, an elastic membrane covering the open end, and a protector covering the elastic membrane. The elastic membrane is seated on a support element and clamped between a tensioning frame and the support element. When the pressure difference exceeds a threshold value, the membrane slides out from between the tensioning frame and the support element.

DE 33 07 835 C2 discloses a check valve system comprising a base having a flow passage with an open end and a sealing surface surrounding the open end, and further comprising an elastic membrane covering the open end, and finally comprising a protector covering at least a portion of the elastic membrane. The elastic membrane is elastically stretched over and forced against the ceiling surface surrounding the open end through the flow passage. This membrane check valve is for use in connection with a spray nozzle for spraying herbicides.

According to a first aspect of the present invention, there is provided a check valve system comprising a base having a flow passage with an open end and a sealing surface surrounding the open end. An elastic membrane is elastically stretched over and forced against the sealing surface surrounding the open end so as to cover the open end and seal the flow passage. In addition, a protector is provided to cover at least a portion of the elastic membrane. The protector is preferably fixed to the base but may likewise be fixed to the compartment wall. The membrane may be fixed to the protector or base.

In either situation, the force by which the elastic membrane is urged against the sealing surface is an elastic force generated by the stretched elastic membrane. To achieve this result, the sealing surface may be raised relative to the location where the elastic membrane is fixed to the base. In other words, the location where the elastic membrane is fixed to the base is axially set back relative to the sealing surface so that the elastic membrane spanning from the base over the raised sealing surface may have a dome-like or tent-like shape, thereby defining a space surrounding the raised sealing surface, which space is limited by the elastic membrane and the base to which the elastic membrane is fixed.

Thus, when the pressure inside the flow passage under the elastic membrane exceeds a pressure above the elastic membrane by a certain pressure difference, the elastic membrane will lift from the sealing surface and allow gas or liquid or whatever is under pressure within the flow passage to leak from the flow passage's open end, e.g. into the aforementioned space surrounding the sealing surface and further to the atmosphere.

Properly attaching the elastic membrane to the base makes it possible to finely adjust the elastic stretching force of the membrane and, thus, the pressure difference at which the check valve system operates. The pressure difference at which the check valve system operates according to the present invention is set to a value in the range of 1 mbar to 200 mbar. Preferred values are more than 1 mbar, more preferably equal to or more than 2 mbar, even more preferably equal to or more than 5 mbar, and most preferably equal to or more than 10 mbar. On the other hand, preferred pressure differences at which the check valve system operates are equal to or below 100 mbar, even more preferably equal to or below 50 mbar, and most preferably equal to or below 30 mbar. For instance, the check valve system may operate between 20 and 25 mbar.

The elastic membrane may be formed integrally with the valve, e.g. in a molding process where the base is injection molded against and partly around the elastic membrane. According to an alternative preferred method, however, the elastic membrane is welded or bonded to the base.

In order to enable the gas, fluid or other material to escape from the check valve's flow passage through the lifted membrane towards the atmosphere, the membrane may be fixed to the base only at discrete areas so as to allow the fluid to escape from underneath the membrane towards the outside between the discrete areas.

Alternatively or in addition, the base may comprise one or more venting passages which connect the atmosphere with a space between the location where the elastic membrane is fixed to the base and the sealing surface. Such venting passage is preferably a labyrinth passage to avoid spray water or other contaminants entering said space underneath the elastic membrane.

The protector covering at least a portion of the elastic membrane may vary in type and shape. According to a first embodiment, the protector has a ring shape and covers the membrane at least in the area or areas where the membrane is connected to the base so as to protect the connection between the membrane and the base and avoid damage or deterioration by radiation, chemicals and the like.

According to a second embodiment, the protector comprises a cap covering the elastic membrane so that the entire membrane and not only its connection area is protected against the environment. The cap preferably has holes so that air between the cap and membrane can escape quickly when the check valve operates, and such holes are preferably designed as drain holes so that liquid, which may enter through the holes when the valve is submerged into water or subjected to heavy rainfall or used in splashing environments, can easily enter and drain from the space between the cap and the elastic membrane. For instance, when the valve is submerged into water, the water entering the cap and covering the membrane first seals the membrane and may then drain again from the cap. Preferably, one or more of the drain holes are provided in the cap so as to allow inflow/drainage when the vent is in at least one of the following positions: a normal position where the elastic membrane is positioned substantially horizontally above the open end of the flow passage, an inclined position where the elastic membrane is inclined relative to the horizontal, and an upside-down position where the elastic membrane is positioned substantially horizontally below the open end.

As a third embodiment of the protector, which may also be combined with the aforementioned first and second protector embodiments, the protector may comprise a splash barrier around at least a central portion of the elastic membrane. The splash barrier may have the form of a wall which may protrude from the base and/or depend from the cap. The splash barrier may likewise have through holes to allow liquid to drain from inside the splash barrier through the through holes towards the drain holes of the cap.

In one embodiment, the protector is fixed, preferably tightly welded or clipped, to the base. In another embodiment, the protector is fixed, preferably clipped, to the compartment wall.

The base may be made from plastic material, in particular from molded plastic, preferably injection molded plastic. Plastic materials are preferably thermoplastic materials, thermoplastic elastomer materials and cross-linked materials such as elastomer materials or others. Preferred thermoplastic materials include polyamide (PA), polybutylene terephthalate (PBT), or polyoxymethylene (POM). The plastics materials may be glass fiber filled to obtain reinforcement or a cost reduction. Instead of plastics materials, metals may likewise be employed for the base. The protector of the check valve system may likewise be made from the aforementioned materials. Preferably, the base and the protector are made of the same material.

The maximum outer dimension of the check valve system is relatively small at 150 mm or less as measured in a general plane defined by the sealing surface. A preferred outer diameter is about 50 mm, whereas the outer diameter is preferably more than 20 mm. The minimum cross-sectional area of the flow passage may range between about 3 $mm^2$ to about 2,000 $mm^2$ (corresponding to a circular cross section between 2 mm and 50 mm). For instance, preferred check valve systems may have a maximum outer diameter of 50 mm and the flow passage a minimum inner diameter of 22 mm, while check valve systems with a larger minimum inner diameter can have a larger maximum outer diameter, and a check valve system with a smaller minimum inner diameter can have a smaller maximum outer diameter.

With respect to the elastic membrane, the thickness thereof preferably ranges between 10 μm and 1 mm, more preferably between 25 μm and 400 μm, and even more preferably between 100 μm and 150 μm. Most preferably, the thickness of the elastic membrane is about 130 μm.

The elastic membrane according to the present invention is a multilayer membrane which comprises at least one elastic layer and at least one stabilizing layer to impart stability to the elastic layer. The stabilizing layer itself does not have to be elastic. Rather, the stabilizing layer is preferably non-elastic and can be extended to a certain extent beyond which further extension would cause the stabilizing layer to rupture. Thus, the non-elastic stabilizing layer limits the stretchability of the elastic layer. Preferably, the extendibility of the stabilizing layer may limit the stretchability of the membrane to 30% or less. The tension strength of the stabilizing layer is chosen such that said layer will not rupture in use but rather limit the elastic stretching of the elastic layer so as to prevent failure of the elastic layer when the vent operates.

The stabilizing layer has a preferred thickness of 150 μm or less. Preferably, the stabilizing layer comprises or is made from a fluoropolymer, preferably fluorothermoplastic and/or fluoroelastomer, more preferably polytetrafluoroethylene (PTFE), even more preferably expanded PTFE (ePTFE), and most preferably a structured or compacted ePTFE film.

In a particularly preferred specific embodiment of the invention, the stabilizing layer is provided in the form of a self-supported, wrinkled film to which the elastic layer is adhered. The process of manufacturing such multilayer elastic membrane is disclosed in EP 2 839 949 A1 from W. L. Gore & Associates GmbH, and the multilayer membranes as well as the manner of producing them as described in EP 2 839 949 A1 are incorporated herein by reference. Accordingly, the stabilizing layer, called "film" in EP 2 839 949 A1, is applied onto a stretched elastic substrate, and upon relaxation of the stretched elastic substrate, the adhered film wrinkles, thereby forming a structured film. Such film is provided with a backer material, which may be formed by the relaxed elastic substrate. Alternatively, the backer material may be formed by a separate layer, which for the purpose of the present invention would be an elastic layer, and the relaxed elastic substrate on which the structured film was originally formed is preferably removed. When the resulting multilayer elastic membrane is stretched, such stretching will be limited to the point where the structured film, preferably a PTFE film, is extended to its original size with basically no wrinkles left.

According to a different preferred embodiment, relaxation of the stretched elastic substrate does not cause the adhered film to wrinkle. Rather, the film compacts, i.e. the cross-sectional area in at least one direction of the film is reduced so that a compacted film is obtained. For instance, when the film is made of a material consisting of nodes connected by fibers, as in ePTFE, the fibers between the nodes bend and wrinkle within the film when the stretched substrate is relaxed, thereby moving the nodes of the film closer together and changing the internal film structure. When an elastic membrane comprising such a compacted film as a stabilizing layer is elastically stretched, the bent and wrinkled fibers within the film will be extended, and stretching of the elastic membrane is limited to the point where no further extension of the fibers is possible.

In either of the aforementioned preferred multilayer elastic membranes, the elastic backer material "freezes" the structured or compacted state of the film to which it is applied.

According to a first aspect of the invention, the elastic membrane is liquid-tight and air-tight. Thus, any passage of liquid or air through the check valve system requires the elastic membrane to lift from the sealing surface. A single-layer membrane may be used as the liquid-tight and air-tight elastic membrane. The single-layer non-porous elastic membrane may be made from silicones, in particular fluorosilicones, polyurethane (PUR), polysiloxane, EPDM, natural rubber (caoutchouc) and other elastomers. If a multilayer membrane is used as the elastic membrane comprising one or more elastic layers and one or more stabilizing layers, the elastic layer should be liquid-tight and air-tight and preferably face the sealing surface, whereas the stabilizing layer may or may not be liquid- and air-tight. For instance, the stabilizing layer may be formed from a compacted ePTFE film and the elastic layer may be formed as a full-surface elastomer coating on the compacted ePTFE film.

According to a preferred second aspect of the invention, there is provided a check valve system in which the check valve functionality is combined with a vent functionality, more specifically a low pressure vent, which allows venting of air or gas to and from the compartment at pressure differences that are lower than the pressure difference at which the check valve operates. According to a first embodiment thereof, the low pressure vent is provided in or on a by-pass passage by-passing the check valve. Preferably, the low pressure vent and the check valve may share the same base, i.e. the base of the check valve system is also a base for the low pressure vent. For instance, the low pressure vent may comprise a porous membrane closing the by-pass and made from one or more of the following materials: porous silicone, porous polyurethane (PUR), expanded PE or expanded polytetrafluoroethylene (ePTFE).

According to a preferred second embodiment of said preferred second aspect of the invention comprising the check valve and low pressure vent, the check valve and the low pressure vent are integrated in that the elastic membrane of the check valve system is gas-permeable and, preferably, waterproof. Suitable materials for the single-layer elastic membrane may comprise one or more of the following: porous silicone, porous polyurethane (PUR). Said materials may likewise be used as the elastic layer in combination with a stabilizing layer in a multilayer membrane. In particular, where the stabilizing layer is porous, such as the aforementioned structured or compacted ePTFE film, the elastic layer may be a porous layer or, if not porous, may comprise macroscopic openings so as to allow air or gas to reach the porous stabilizing layer while still imparting sufficient elasticity to the porous stabilizing layer in order that the multilayer membrane can fulfill its check valve functionality.

The term "porous" as used herein refers to a material having voids throughout the internal structure which form an interconnected continuous air path from one surface to the other. The term "porous film" or "porous layer" as used herein denotes a film or layer which comprises, or consists of, a porous material. For example, a porous material may be expanded polytetrafluoroethylene (ePTFE) and/or any other cast and processed expanded fluoropolymer or a combination thereof. The porous stabilizing layer preferably has an average pore size of from 0.1 to 50 μm, preferably 0.2 to 5 μm, more preferably 0.5 to 2.5 μm.

Preferably, the maximum air flow capacity of the check valve system is between 500 times and 2,000 times greater when the check valve is in operation as compared to the flow capacity through the low pressure vent as measured at a pressure difference when the check valve starts to operate.

A preferred method of using the check valve system, without or preferably with the integrated venting functionality, provides that the system is arranged with the elastic membrane inclined relative to the horizontal and positioned below the open end of the flow passage. This allows liquid on the inside of the elastic membrane to flow downwards along the membrane due to gravitational forces and accumulate next to the sealing surface, while maintaining the venting functionality of the membrane. When a larger amount of liquid has accumulated, the weight of the liquid will cause the elastic membrane to lift from the sealing surface so that liquid can drain from the flow passage.

The invention will now be explained in further detail with reference to the accompanying drawings, which show preferred, non-limiting embodiments of the invention.

Figure 1B:
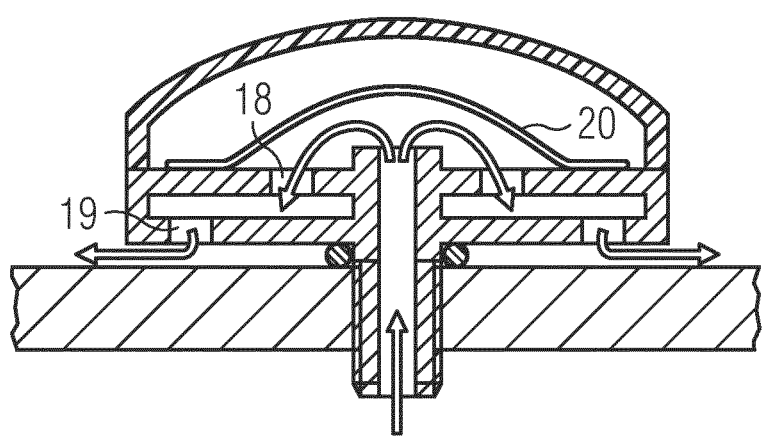
Figure 2A:
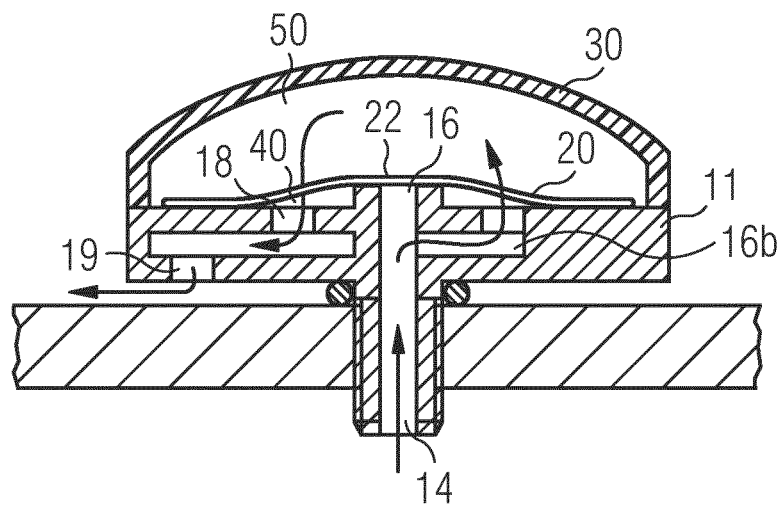
Figure 2B:
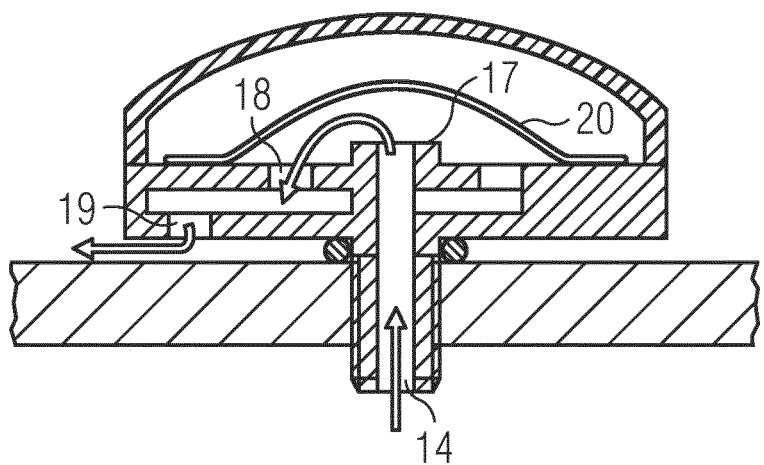
Figure 3A:
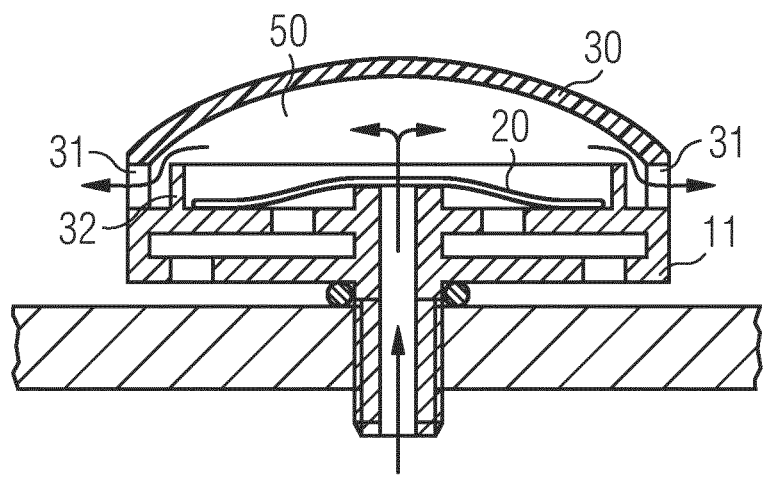
Figure 3B:
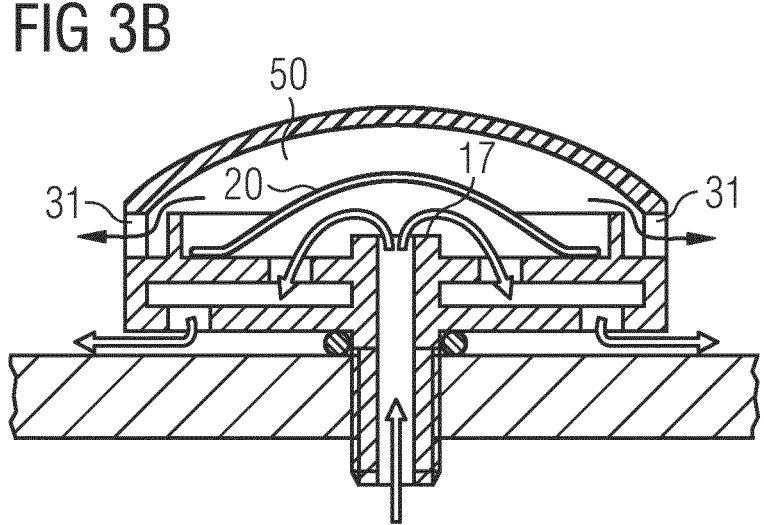
Figure 4A:
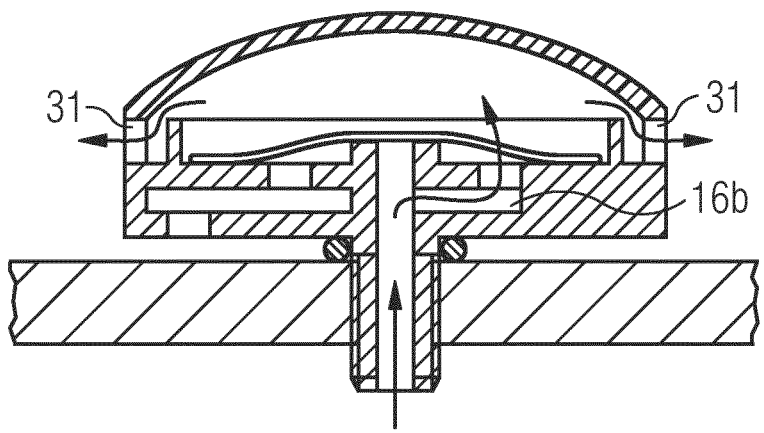
Figure 4B:
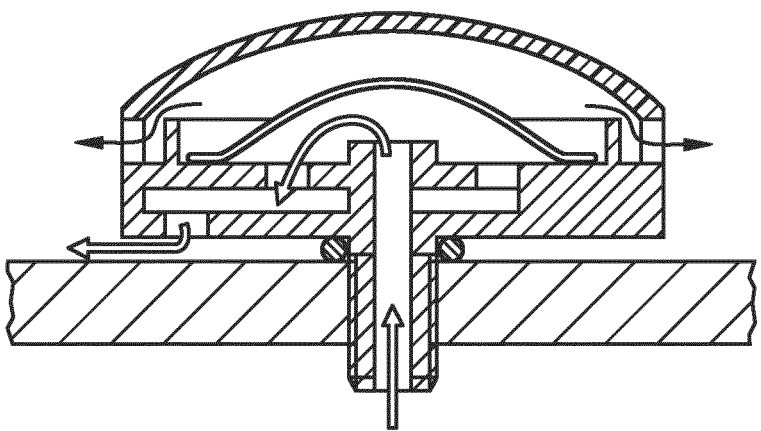
Figure 5A:
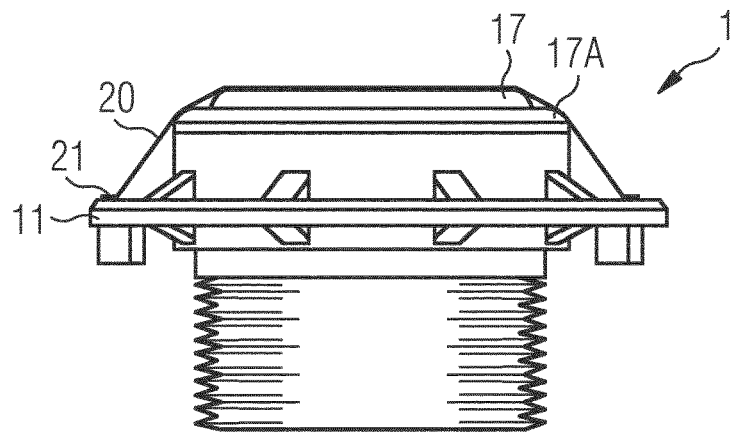
Figure 5B:
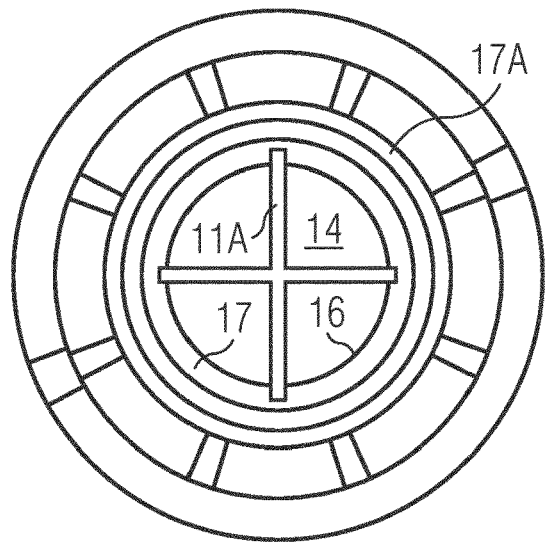
Figure 5C:
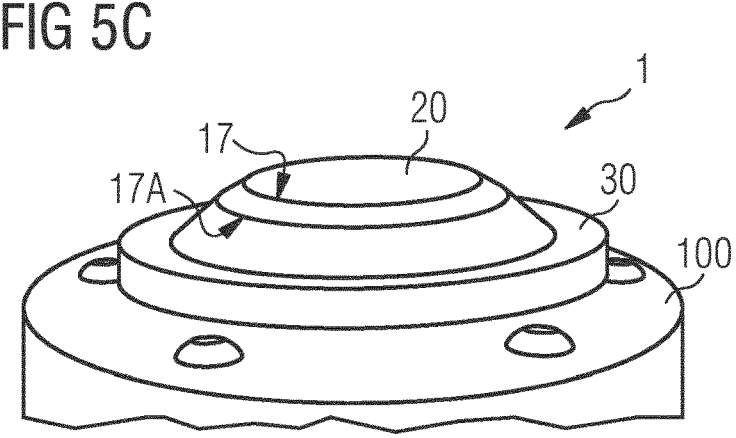
Figure 6A:
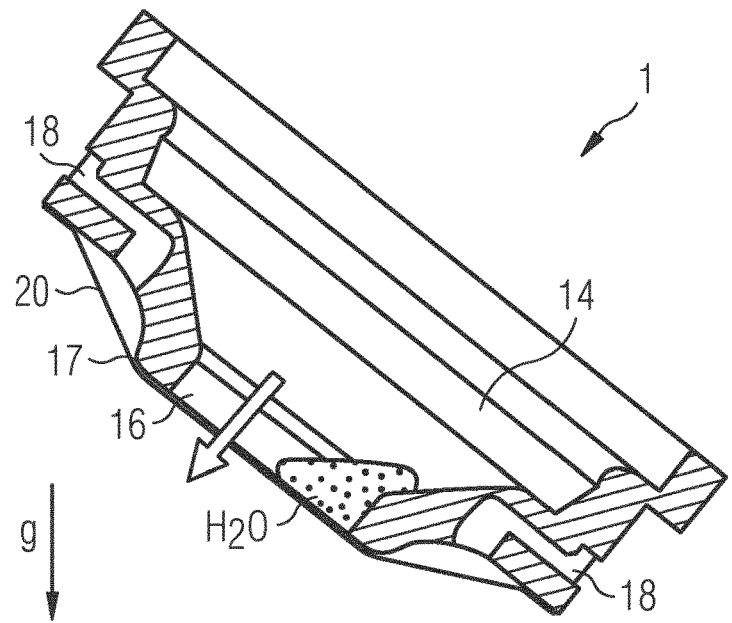
Figure 6B:
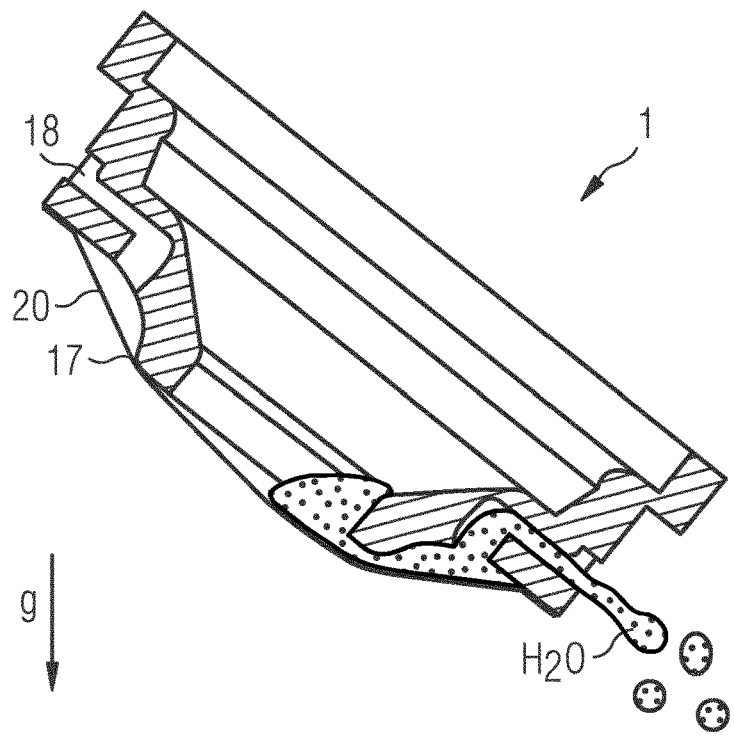
Figure 7A:
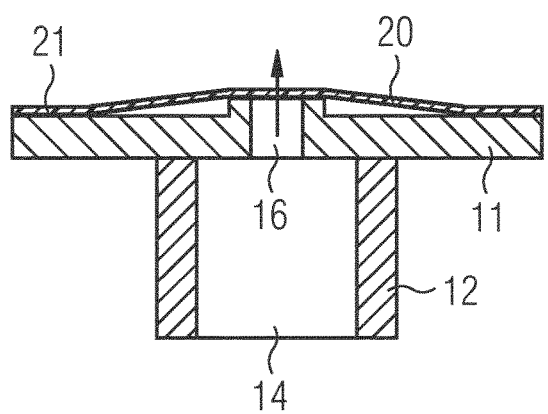
Figure 7B:
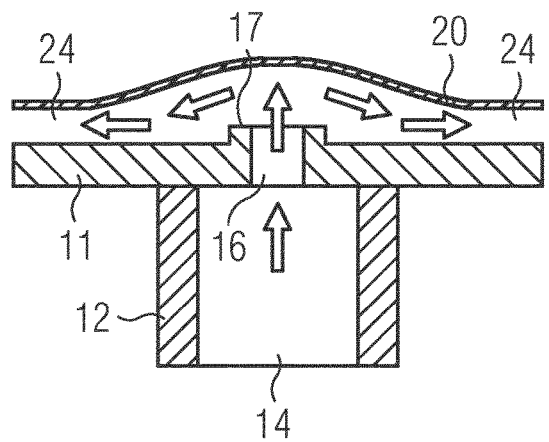
Figure 7C:
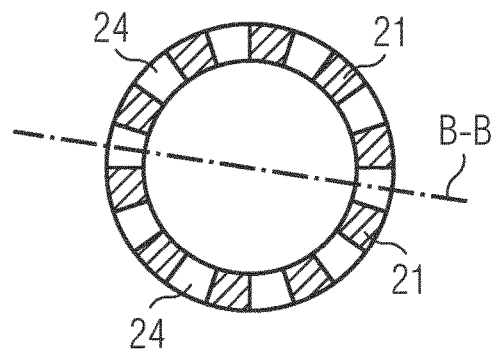
Figure 7D:
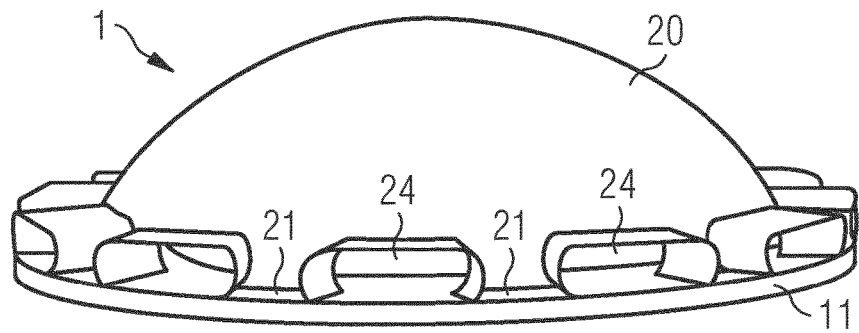
Figure 8A:
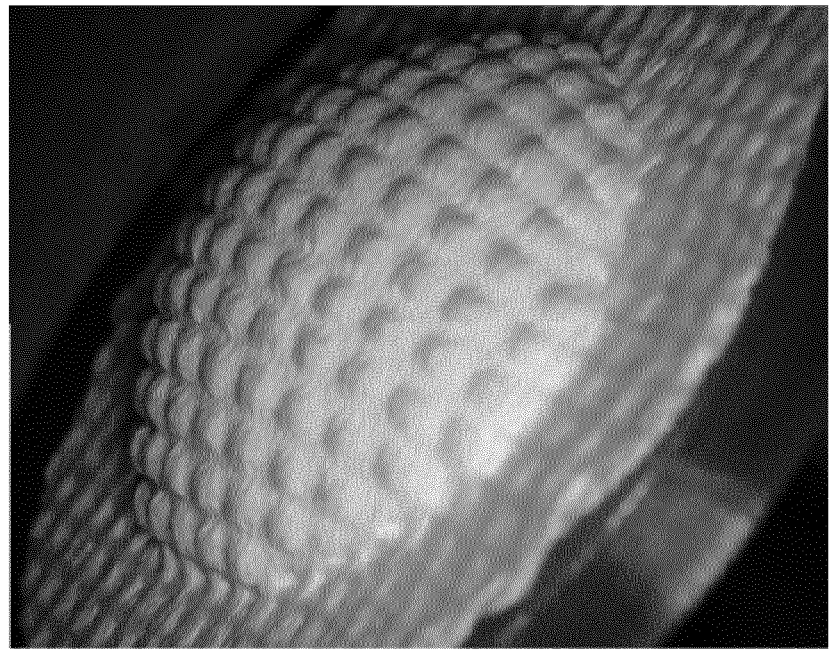
Figure 8B:
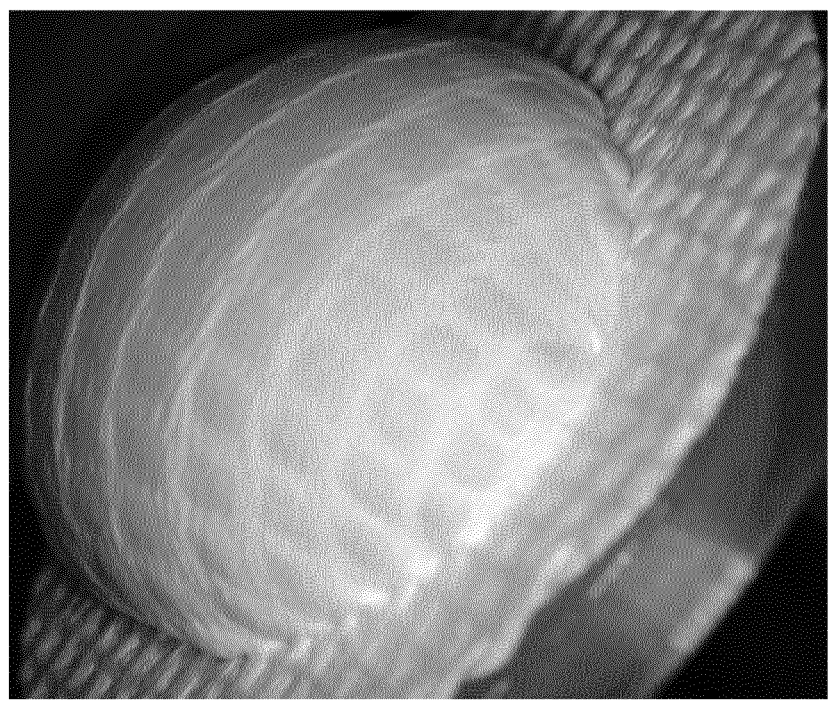

FIGS. 1A and 1B show a check valve system according to one embodiment of the invention in a normal state and in an operating state, respectively, FIGS. 2A and 2B show a check valve system according to another embodiment of the present invention in a normal state and in an operating state, respectively, FIGS. 3A and 3B show a check valve system according to a further embodiment of the invention in a normal state and in an operating state, respectively, FIGS. 4A and 4B show a check valve system according to an even further embodiment of the invention in a normal state and in an operating state, respectively, FIGS. 5A and 5B show a check valve system according to an even further embodiment of the invention as a side view and as a top plan view, FIG. 5C is a perspective view of a check valve system in accordance with the check valve shown in FIGS. 5A and 5B, FIGS. 6A and 6B show a specific arrangement of a check valve system according to an even further embodiment of the invention during use in an inclined position in a normal state and in an operating state, respectively, FIGS. 7A to 7D show a check valve system according to an even further embodiment of the invention, and FIGS. 8A and 8B show an elastic membrane in a partially and a fully stretched state, respectively.

FIG. 1A shows a check valve system comprising a check valve 1 mounted in a through hole of a wall 100 of a compartment (not shown). The check valve 1 comprises a valve body 10 having a base 11 and a leg 12 which depends from the base 11 and serves to fix the valve body 10 in the through hole of the compartment wall 100. In the embodiment as shown, the leg 12 has an outer thread and is screwed into the through hole so as to compress a sealing ring 13 between the base 11 and an upper surface of the compartment wall 100 in order to tightly seal the check valve 1 against the through hole. The check valve 1 may be mounted in or over the through hole in many other ways, including snap-fitting, welding, bonding and the like. A flow passage 14 penetrates the leg 12 and base 12 and has one open end 15 leading into the compartment and another open end 16 leading outside the compartment and covered by an elastic membrane 20. The arrangement can be the other way round such that the open end 15 leads to the atmosphere whereas the open end 16 covered by the elastic membrane 20 leads into the compartment, depending upon the circumstances.

The membrane 20 is covered by a protector 30, here in the form of a cap, which is fixedly connected to the base 11. The cap 30 is tightly welded to the base 11 so as to form a preferably hermetically tight connection between said two components. Alternatively, the protector 30 may be clipped to, or held by clipping elements against, the base 11, it possibly being acceptable if the connection is not hermetically tight. In yet another alternative (not shown), the protector 30 is not fixed to the base 11 but to the compartment wall 100. The elastic membrane 20 is fixed to the base 11 in a circumferential area 21, preferably by bonding, in a state where it is elastically stretched over a raised sealing surface 17 surrounding the open end 16 of the flow passage 14. In order to securely close the open end 16 by the membrane 20, the sealing surface 17 protrudes from the base 11 to a certain extent so that elastic forces generated by the stretched elastic membrane 30 cause the elastic membrane 20 to lie flat against the sealing surface 17. In other words, the surface of the base 11 to which the membrane is fixedly attached is somewhat set back axially relative to the sealing surface 17. As a result, the elastic membrane 20 forms a dome or tent over the base 11 and sealing surface 17. The base 11 comprises a plurality of venting passages 18 and 19 as part of a labyrinth passage that connects the atmosphere with a space 40 formed between the area 21 where the elastic membrane 20 is fixed to the base 11 and the sealing surface 17.

In this embodiment, the elastic membrane 20 is gas-permeable and preferably waterproof. That is, water on the membrane 20 will not pass through the membrane whereas gas or air can pass the membrane through pores in the membrane. As long as the pressure inside the flow passage 14 does not exceed a certain limit, the membrane acts as a low pressure vent allowing only gas or air to pass from the flow passage 14 through the membrane 20 into a space 50 underneath the cap 30, and further again through the membrane 20 and through the venting passages 18, 19 into the atmosphere. Once a pressure difference between the inside of the flow passage 14 and the space 50 underneath the cap 30 exceeds said certain limit, the membrane 20 will lift from the sealing surface 17 due to its elastic properties. This is shown in FIG. 18B. The arrows indicate that high pressure air, gas, or even liquid may flow through the venting passages 18, 19 to the atmosphere without being obstructed by the membrane 20.

As an example, the differential pressure limit at which the elastic membrane 20 lifts from the sealing surface 17 may be set at above 25 mbar, and the air or gas flow capacity through the membrane 20 at 25 mbar may be set as 50 l/h, depending on the porosity of the membrane and the cross section of the open end 16 as defined by the sealing surface 17. Once the check valve is in full operation with the flexible membrane 20 being lifted high above the sealing surface 17, the flow capacity can rise to 25,000 l/h or more, depending on the cross sections of the flow passage 14 and venting holes 18, 19 as well on the pressure difference.

Alternatively, the elastic membrane 20 is not permeable to air or gas, in which case the low pressure venting function as described above in relation to FIG. 1A is not present, but the check valve 1 offers only the check valve functionality as described in relation to FIG. 1B above.

FIGS. 2A and 2B show a different embodiment of a check valve in which only a peripheral portion of the membrane 20 is permeable to air or gas and preferably impermeable to water, whereas a central portion 22 of the membrane 20 closing the open end 16 is impermeable to air and gas. Thus, in this embodiment air and gas cannot vent though the open end 16 of the flow passage 14 at low pressures, i.e. pressures of 25 mbar or below. However, a bypass flow passage 16b connects the flow passage 14 with the space 40 between the elastic membrane 20 and the base 11. As in the embodiment described above, gas or air can flow through the by-pass 16b, permeate through the membrane 20 into the space 50 underneath the cap 30 and again through the membrane 20 and further through the venting holes 18, 19 into the atmosphere, as indicated by arrows in FIG. 2A. Thus, in this embodiment the check valve functionality and the low pressure venting functionality are separate from each other, while still being realized with the same membrane 20.

FIG. 2B shows the check valve of FIG. 2A in its operative state when the membrane 20 is lifted from the sealing surface 17 due to a high pressure difference between the compartment and the atmosphere, wherein air, gas, or even liquid can flow from the flow passage 14 through the venting passages 18, 19 towards the outside without being obstructed by the membrane 20.

In an alternative embodiment (not shown), separate membranes may be provided, namely a liquid-tight and air-tight first membrane above the open end 16 providing the check valve functionality and an air- or gas-permeable and, preferably, waterproof second membrane covering the by-pass 16b and providing the low pressure venting functionality.

FIGS. 3A and 3B show a further embodiment which is slightly different from the embodiment described in relation to FIGS. 1A and 1B and which is particularly suitable in applications where the pressure difference at which the check valve function sets in may arise very rapidly. For such a situation, when the membrane 50 quickly rises high above the sealing surface 17, as shown in FIG. 3B, in order to allow for the air in the space 50 defined between the cap 30 and the membrane 20 to escape quickly, the cap 30 has drain holes 31. In addition, as shown in FIG. 3B, air or gas passing from the flow passage 14 through the membrane 20 only needs to pass the membrane 20 once and can also easily escape through the drain holes 31 to the atmosphere, as indicated by arrows in FIG. 3A. The check valve functionality as shown in FIG. 3B is not any different to the check valve functionality as described above in relation to FIG. 1B.

In this embodiment, in order to prevent the membrane 20 being inadvertently contaminated with oil or splashed with water, an additional protector in the form of a splash barrier 32 surrounds the membrane 20. The splash barrier 32 may have the form of a wall which, in the embodiment shown, rises from the base 11, but it may alternatively depend from the ceiling of cap 30. A plurality of splash barriers may be provided, depending from the cap 30 and/or rising from the base 11. The drain holes 31 are arranged such that the contaminants, such as oil or water, can easily drain from the space 50 underneath the cap 30. The splash barrier 32 may have additional drain holes, preferably at locations angularly offset from the drain holes 31 in the cap 30, so that liquid can drain from inside the splash barrier 2B to the drain holes 31 in the cap.

FIGS. 4A and 4B show an even further embodiment which is a combination of the embodiments shown in FIGS. 2A, 2B, and 3A, 3B, i.e. comprising a by-pass 16b, on the one hand, and drain holes 31, on the other hand. All functionalities offered by these structures are identical to those as described in respect of the embodiments shown in FIGS. 2A, 2B, and 3A, 3B.

An even further embodiment is shown in FIGS. 5A to 5C. While FIGS. 5A and 5B show a side view of the check valve 1 with the membrane 20 shown in cross section (FIG. 5A) and as a top plan view without the membrane (FIG. 5B), FIG. 5C is a perspective view of the check valve 1 attached to a compartment wall 100 and provided with a ring-shaped protector 30 covering the circumferential area 21 where the membrane 20 is fixed to the base 11. As can be seen in the plan view shown in FIG. 5B, a support structure 11A extends? at the open end 16 of the flow passage 14 crosswise to provide support for the membrane 20.

In this embodiment, there is a secondary sealing surface 17A which surrounds the (primary) sealing surface 17 in order to increase the reliability of the check valve against leakage. Due to the particular arrangement of the secondary sealing surface 17A extending somewhat radially outwards and set back somewhat axially with respect to the (primary) sealing surface 17, the elastic forces generated by the stretched elastic membrane 20 and urging the elastic membrane 20 against the secondary sealing surface 17A are somewhat lower than the elastic forces urging the elastic membrane 20 against the (primary) sealing surface 17, so as to ensure that when the check valve 1 starts to operate and the membrane 20 lifts from the (primary) sealing surface 17 the membrane will also lift from the secondary sealing surface 17A. The positioning of the sealing surfaces 17 and 17A is accordingly also visible in the perspective view shown in FIG. 5C.

According to another preferred embodiment, shown in FIG. 5C, departing from what is shown in FIG. 5A, the membrane 20 is not fixed to the base 11 but to the protector 30. In the embodiment shown in FIG. 5C, the membrane 20 can first be fixed to the bottom side of the ring-shaped protector 30 and then mounted, e.g. clipped, onto the base 11 so that the membrane 20 is stretched over the sealing surface 17. This is particularly advantageous when the membrane 20 has a PTFE layer as the uppermost layer and e.g. an elastomeric layer as the lowermost layer, because PTFE can be welded to other materials, here the protector ring 30, whereas it would be difficult to weld an elastomer to the base 11.

FIGS. 6a and 6B show a specific arrangement of an even further embodiment of a check valve 1 which is similar in structure to the embodiment described above in relation to FIGS. 1A and 1B. However, the protector 30 protecting the membrane 20 is not shown in FIGS. 6A and 6B. The check valve 1 is oriented such that the elastic membrane 20 is inclined relative to the horizontal and positioned below the open end 16 of the check valve's flow passage 14. This arrangement allows liquid, such as water $H_2O$, to accumulate in a corner defined by the membrane 20 and the flow passage 14 so that air or gas can still pass through the elastic membrane 20, as indicated by an arrow. When the amount of water reaches a certain level, gravitational forces (indicated by the arrow g) acting on the liquid $H_2O$ cause the membrane 20 to lift from the sealing surface 17 so that the liquid can drain through the vent holes 18 into the atmosphere. Thus, the low pressure venting functionality of the check valve 1 will not be blocked by any water (or other liquid) that may accumulate on the inside surface of the membrane 20.

FIG. 7B shows an even further embodiment of a check valve which differs from the previously described embodiments in that the vent holes 18,19 in the base 11 can be omitted. Instead, in order that the air, gas, or liquid released from the compartment can escape from underneath the membrane 20 towards the atmosphere, the membrane is fixed to the base 11 only at discrete areas 21, so that the fluid can escape from under the membrane between the discrete areas 21. When the check valve is in operation and the membrane 20 lifts from the sealing surface 17, as shown in the cross-sectional view of FIG. 7B (see section line B-B in FIG. 7B), flow channels 24 are formed by the pressure of the escaping fluid, as schematically illustrated in the perspective view of FIG. 7D.

As mentioned above, the elastic membrane 20 may be a multilayer membrane comprising at least one elastic layer which may or may not be porous and at least one stabilizing layer which likewise may or may not be porous, depending on whether or not the check valve incorporates a low pressure venting functionality. If the elastic membrane is porous and, thus, incorporates the low pressure venting functionality, the support structure may be in the form of the previously mentioned structured or compressed porous film made e.g. from ePTFE which can be extended but has no particular elasticity, and the elastic layer connected to the porous stabilizing layer may have macroscopic openings so as to allow air or gas to reach the porous stabilizing layer, on the one hand, and impart elasticity to the porous stabilizing layer, on the other hand. This is shown in FIGS. 8A and 8B. FIG. 8A shows the membrane 20 of the vent in operation when it is partially lifted from the sealing surface 17. Here, the elastic layer forms a grid on the stabilizing layer and the pressure underneath the membrane causes the structured or compacted film to expand through the openings in the elastic layer. FIG. 8B shows the final stage of maximum extension where the structured or compacted film limits any further stretching of the elastic layer and, thus, of the entire membrane.

While EP 2 839 949 A1 describes the manufacture of a membrane comprising such a "structured" film, an example of manufacture will now be described for an elastic membrane with a "compacted" film.

EXAMPLE

An ePTFE membrane was made by processes known in the art, for example U.S. Pat. No. 5,814,405 or DE 69617707. The membrane had an average ATEQ air flow 54 l/h (at 12 mbar test pressure), a water entry pressure (WEP) of 28 psi (1.93 bar), a bubble point of 8.2 psi (0.57 bar), an average Gurley number of 2.8 Gurley seconds and a mass per area of 10 $g/m^2$. The membrane had an average transverse direction rigidity of 29.7 g/m and average machine direction rigidity of 9.8 g/m, measured according to ASTM D2923-08 Method B, using a Handle-U Meter test device (Thwing-Albert Instrument Company) at 20° C. A by-component copolyester spunbond was used as an elastic support material. The membrane was adhered to the stretched elastic substrate with slight pressure. The elastic substrate was relaxed in the longitudinal direction by a processing ratio of 200% (2:1 biaxially; 4:1 areal change) with the adhered film thereon, thereby obtaining a compacted film. No visible out-of-plane structures occurred, as evidenced by a structure density of 0.0/mm in both the x and y directions, but only the fibers within the membrane folded. No delaminating of the compacted membrane from the elastic substrate occurred upon relaxation in the longitudinal direction.

The structured film was coated with an elastomeric support material to form a film assembly. A 100 micron paper was laser-cut with slots 100 microns wide spaced at about 1 mm. Wacker Elastosil RT 620 silicone components? A and B were mixed at a mass ratio of 9:1 and the material was pressed through the slots of the paper. The material was cured in an oven for 3 minutes at 80° C. A second similar line coating with Elastosil RT 620 was then applied at right angles to the first line coating to form a grid coating. After coating, the structure was cured again at 80° C. for 3 minutes, to obtain the final elastic membrane 20 for the check valve 1. For the embodiments shown in FIGS. 2 and 4, the portion 22 of the membrane 20 covering the open end 16 of the flow passage 14 was provided with an additional circular elastomeric coating of Elastosil RT 620 through a laser-cut circle on a 100 micron thick paper.

Measurement Methods a) Rigidity Measurements

Rigidity of the porous films may be measured according to ASTM D-2923-08, procedure B. Although this method is indicated to be suitable for polyolefin film, it may also be used for films made of other materials. For measuring rigidity, a Handle-O-Meter test device (Thwing-Albert Instrument Company) may be used.

b) ATEQ Air Flow

Air flow is measured using an ATEQ Air Flow Meter at a pressure of 70 mbar.

c) Gurley Number

Gurley numbers [s] were determined using a Gurley densiometer according to ASTM D 726-58. The results are reported in terms of Gurley Number, which is the time in seconds for 100 cubic centimeters of air to pass through 6.54 cm² of a test sample at a pressure drop of 1.215 kN/m² of water.

d) Further Properties

Further properties, such as bubble point, water entry pressure, pore size and porosity, were measured as indicated in US 2007/0012624, unless otherwise indicated herein.

Preferred embodiments of the invention are specified in the following 27 items:

1. A check valve system for a through hole in a wall (100) of a compartment to limit a pressure difference between an inside and an outside of the compartment, comprising
    a base (11) having a flow passage (14) with an open end (16) and a sealing surface (17) surrounding the open end (16),
    an elastic membrane (20) covering the open end (16), and
    a protector (30) covering at least a portion of the elastic membrane (20), wherein the elastic membrane (20) is elastically stretched over and forced against the sealing surface (17) surrounding the open end (14) so as to seal the flow passage (14).
2. The check valve system according to item 1, wherein the elastic membrane (20) is arranged to lift from the sealing surface (17) when a pressure inside the flow passage (14) under the elastic membrane (20) exceeds a pressure above the elastic membrane by a pressure difference in the range of 1 mbar to 500 mbar.
3. The check valve system according to item 2, wherein the pressure difference at which the elastic membrane (20) is arranged to lift from the sealing surface (17) is >1 mbar, preferably ≥2 mbar, more preferably ≥5 mbar, and most preferably ≥10 mbar.
4. The check valve system according to item 3, wherein the pressure difference at which the elastic membrane (20) is arranged to lift from the sealing surface (17) is ≥200 mbar, preferably ≥100 mbar, more preferably ≥50 mbar, and most preferably ≥30 mbar.
5. The check valve system according to any one of items 1 to 4, wherein the elastic membrane (20) is fixed, preferably welded or bonded, to the base (11) at discrete areas (21), thereby allowing fluid to escape from under the membrane between the discrete areas (21).
6. The check valve system according to any one of items 1 to 5, wherein the base (11) comprises at least one venting passage (18, 19) connecting the atmosphere with a space (40) between the sealing surface (17) and a location (21) where the elastic membrane (20) is fixed to the base (11).
7. The check valve system according to item 6, wherein the venting passage (18, 19) is a labyrinth passage.
8. The check valve system according to any one of items 1 to 7, wherein the protector (30) comprises a cap covering the elastic membrane (20).
9. The check valve system according to item 8, wherein the protector (30) comprises one or more drain holes (31) for liquid to enter or escape from a space (50) between the protector (30) and the elastic membrane (20).
10. The check valve system according to item 9, wherein one or more of the drain holes (31) are provided in the protector so as to allow drainage when the check valve (1) is in at least one of the following positions: a normal position where the elastic membrane (20) is positioned substantially horizontally above the open end (16), an inclined position where the elastic membrane (20) is inclined relative to the horizontal, and an upside-down position where the elastic membrane (20) is positioned substantially horizontally below the open end (16).
11. The check valve system according to any one of items 1 to 10, wherein the protector (30) comprises a splash barrier (32) around at least a central portion of the elastic membrane (20).
12. The check valve system according to any one of items 1 to 11, wherein the protector (30) is fixed, preferably tightly welded, to the base (11).
13. The check valve system according to any one of items 1 to 12, wherein the elastic membrane (20) has a thickness in the range of 10 μm to 1 mm, preferably in the range of 25 μm to 400 μm, more preferably in the range of 100 μm to 150 μm.
14. The check valve system according to any one of items 1 to 13, wherein the elastic membrane (20) is fixed to the protector (30).
15. The check valve system according to any one of items 1 to 14, wherein the elastic membrane (20) is a multilayer membrane comprising at least one elastic layer and at least one stabilizing layer with limited extendibility.
16. The check valve system according to item 15, wherein the stabilizing layer has a thickness of ≥150 μm.
17. The check valve system according to item 15 or 16, wherein the stabilizing layer comprises or is made from a fluoropolymer, preferably fluorothermoplastic and/or fluoroelastomer, more preferably polytetrafluoroethylene (PTFE), even more preferably expanded PTFE (ePTFE), and most preferably a structured or compacted ePTFE film.
18. The check valve system according to any one of items 1 to 17, wherein the elastic membrane (20) is liquid-tight and air-tight.
19. The check valve system according to any one of items 1 to 17, wherein the elastic membrane (20) is air-permeable or gas-permeable and, preferably, waterproof.
20. The check valve system according to any one of items 14 to 17, wherein the stabilizing layer is waterproof and porous to allow air or gas to permeate through the membrane (20), and the elastic layer has macroscopic openings so as to allow air or gas to reach the porous stabilizing layer as well as impart elasticity to the porous stabilizing layer.
21. The check valve system according to item 20, wherein the stabilizing layer has an average pore size of from 0.1 to 50 μm, preferably 0.2 to 5 μm, more preferably 0.5 to 2.5 μm.
22. The check valve system according to item 20 or 21, wherein the elastic layer is provided as a coating on the porous stabilizing layer.
23. The check valve system according to any one of items 1 to 18, comprising a low pressure vent, the low pressure vent being porous to allow venting of air or gas through the low pressure vent at pressure differences below a pressure difference at which the elastic membrane (20) is arranged to lift from the sealing surface (17).
24. The check valve system of item 23, wherein the base (11) also forms a base for the low pressure vent.
25. The check valve system according to any one of items 1 to 24, wherein the protector (30) is fixed to a compartment wall (100).
26. A check valve arrangement comprising a check valve system according to any one of items 1 to 25 and a compartment having a standard orientation, wherein the check valve system is installed on a wall (100) of the compartment such that the membrane (20) of the check valve system is inclined relative to the horizontal and positioned below the open end (16) of the check valve system's flow passage (14) when the compartment is oriented according to its standard orientation.

27. A method of using the check valve system according to any one of items 1 to 24, wherein the elastic membrane (20) is inclined relative to the horizontal and positioned below the open end (16) of the flow passage (14).

The invention claimed is:

1. A check valve system comprising:
a base having a flow passage with an open end and a sealing surface surrounding the open end;
an elastic membrane covering the open end; and
a protector covering at least a portion of the elastic membrane,
wherein the elastic membrane is configured to be elastically stretched over and forced against the sealing surface surrounding the open end so as to seal the flow passage,
wherein when a pressure inside the flow passage under the elastic membrane exceeds a pressure above the elastic membrane by a pressure difference in the range of 1 mbar to 200 mbar, the elastic membrane is configured to lift from the sealing surface,
wherein the elastic membrane is a multilayer membrane comprising at least one elastic layer which is porous or comprises macroscopic openings and at least one porous stabilizing layer,
wherein the stabilizing layer is configured to limit the elastic stretch of the elastic membrane, and
wherein the check valve system is configured to limit a pressure difference between an inside and an outside of a compartment comprising a through hole in a compartment wall.

2. The check valve system according to claim 1, wherein the elastic membrane is configured to be fixed to the base at discrete areas, so as to allow fluid to escape from under the membrane between the discrete areas.

3. The check valve system of claim 2, wherein the elastic membrane is welded or bonded to the base at discrete areas.

4. The check valve system according to claim 1, wherein the base comprises at least one venting passage configured to connect the atmosphere with a space between the sealing surface and a location where the elastic membrane is fixed to the base.

5. The check valve system according to claim 1, wherein the protector comprises a cap configured to cover the elastic membrane.

6. The check valve system of claim 5, wherein the protector comprises one or more drain holes from which liquid is configured to enter or escape from a space between the protector and the elastic membrane.

7. The check valve system according to claim 1, wherein the elastic membrane has a thickness in the range of 10 µm to 1 mm.

8. The check valve system according to claim 1, wherein the elastic membrane is fixed to the protector.

9. The check valve system according to claim 1, wherein the stabilizing layer has a thickness of ≤150 µm.

10. The check valve system according to claim 1, wherein the stabilizing layer comprises a fluoropolymer.

11. The check valve system according to claim 1, wherein the elastic membrane is liquid-tight and air-tight.

12. The check valve system according to claim 1, wherein the stabilizing layer is configured to allow air or gas to permeate through the membrane, and the elastic layer is configured to allow air or gas to reach the porous stabilizing layer as well as impart elasticity to the porous stabilizing layer.

13. The check valve system according to claim 1, further comprising a pressure vent, wherein the pressure vent is porous and thereby configured to allow venting of air or gas through the pressure vent at pressure differences below a pressure difference at which the elastic membrane is configured to lift from the sealing surface.

14. The check valve system according to claim 1, wherein the protector is fixed to the compartment wall.

15. The check valve system of claim 1, wherein the pressure difference is ≤30 mbar.

16. The check valve system of claim 1, wherein the elastic membrane is air permeable or gas permeable.

17. The check valve of claim 16, wherein the membrane is waterproof.

18. A check valve arrangement comprising:
a base having a flow passage with an open end and a sealing surface surrounding the open end;
an elastic membrane covering the open end; and
a protector covering at least a portion of the elastic membrane,
wherein the elastic membrane is configured to be elastically stretched over and forced against the sealing surface surrounding the open end so as to seal the flow passage,
wherein when a pressure inside the flow passage under the elastic membrane exceeds a pressure above the elastic membrane by a pressure difference in the range of 1 mbar to 200 mbar, the elastic membrane is configured to lift from the sealing surface,
wherein the elastic membrane is a multilayer membrane comprising at least one elastic layer which is porous or comprises macroscopic openings and at least one porous stabilizing layer,
wherein the stabilizing layer is configured to limit the elastic stretch of the elastic membrane, and
a compartment,
wherein the check valve system is installed on a wall of the compartment such that the membrane of the check valve system is inclined relative to the horizontal and positioned below the open end of the check valve system's flow passage, and
wherein the check valve system is configured to limit a pressure difference between an inside and an outside of the compartment.

19. A method comprising:
obtaining a check valve system, comprising:
a base having a flow passage with an open end and a sealing surface surrounding the open end,
an elastic membrane covering the open end, and
a protector covering at least a portion of the elastic membrane,
wherein the elastic membrane is a multilayer membrane comprising at least one elastic layer which is porous or comprises macroscopic openings and at least one porous stabilizing layer,
wherein the stabilizing layer is configured to limit the elastic stretch of the elastic membrane;
elastically stretching the elastic membrane over and forced against the sealing surface surrounding the open end so as to seal the flow passage;
increasing a pressure inside the flow passage under the elastic membrane to a pressure above the elastic membrane by a pressure difference in the range of 1 mbar to 200 mbar, thereby lifting the elastic membrane from the sealing surface;
inclining the elastic membrane relative to the horizontal and positioning the elastic membrane below the open end of the flow passage; and limiting the pressure difference between an inside and an outside of a compartment comprising a through hole in a wall.

\* \* \* \* \*